US009881464B2

(12) United States Patent
Jones et al.

(10) Patent No.: US 9,881,464 B2
(45) Date of Patent: Jan. 30, 2018

(54) CORE MODULE FOR AN AUTOMATED TRANSACTION MACHINE

(71) Applicant: Diebold, Incorporated, North Canton, OH (US)

(72) Inventors: Brian Jones, Navarre, OH (US); Michael J. Harty, Canton, OH (US); Thomas A. VanKirk, Medina, OH (US); William D. Beskitt, Canton, OH (US); Jeffrey M. Eastman, North Canton, OH (US); David A. Peters, Tallmadge, OH (US); Clinton L. Boley, Mogadore, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 15/182,541

(22) Filed: Jun. 14, 2016

(65) Prior Publication Data

US 2016/0364958 A1 Dec. 15, 2016

Related U.S. Application Data

(60) Provisional application No. 62/175,330, filed on Jun. 14, 2015.

(51) Int. Cl.

| | |
|---|---|
| ***G06F 19/00*** | (2011.01) |
| ***G07F 19/00*** | (2006.01) |
| ***G07D 11/00*** | (2006.01) |

(52) U.S. Cl.

CPC ....... *G07F 19/205* (2013.01); *G07D 11/0021* (2013.01); *G07F 19/201* (2013.01); *G07F 19/202* (2013.01); *G07F 19/203* (2013.01)

(58) Field of Classification Search

CPC ....... G06F 19/20; G06F 19/202; G06F 19/203

USPC ................................ 235/379, 380, 383, 385

See application file for complete search history.

(56) References Cited

U.S. PATENT DOCUMENTS

| | | | | |
|---|---|---|---|---|
| 6,196,457 | B1 | 3/2001 | Patterson | |
| 7,793,827 | B1 | 9/2010 | Lute et al. | |
| 9,082,253 | B1 * | 7/2015 | Harty | G07F 19/205 |
| 2005/0098622 | A1 | 5/2005 | Jantsch | |

(Continued)

FOREIGN PATENT DOCUMENTS

| | | | |
|---|---|---|---|
| EP | 1445741 | A2 | 8/2004 |
| EP | 2346007 | A2 | 7/2011 |

(Continued)

OTHER PUBLICATIONS

International Search Report and Written Opinion of corresponding PCT application.

*Primary Examiner* — Daniel St Cyr

(74) *Attorney, Agent, or Firm* — Black, McCuskey, Souers & Arbaugh, LPA

(57) ABSTRACT

A core module for an Automated Transaction Machine (ATM) includes a housing including a plurality of cassette bays, a first document delivery system, and a second document delivery system. The first document delivery system is capable of transporting a document between the cassette and the second document delivery system via a first transport path. The second document delivery system is capable of transporting a document between the first document delivery system and an other ATM location via a second transport path.

11 Claims, 15 Drawing Sheets

(56) References Cited

U.S. PATENT DOCUMENTS

| | | | | |
|---|---|---|---|---|
| 2013/0060375 | A1* | 3/2013 | Sato ................... | G07D 11/0084 700/218 |
| 2014/0131163 | A1 | 5/2014 | Yun et al. | |
| 2014/0263619 | A1* | 9/2014 | Turocy .................. | G07F 19/201 235/379 |
| 2015/0363991 | A1* | 12/2015 | Yoon .................... | G07D 11/006 700/232 |

FOREIGN PATENT DOCUMENTS

| | | | |
|---|---|---|---|
| EP | 2874129 | A1 | 5/2015 |
| WO | WO 00/15530 | A1 | 3/2000 |

* cited by examiner

CORE MODULE FOR AN AUTOMATED TRANSACTION MACHINE

CROSS-REFERENCE TO RELATED APPLICATIONS

This application claims priority to and the benefit of U.S. Provisional Patent Application No. 62/175,330 filed 14 Jun. 2015, the contents of which are hereby incorporated by reference in their entirety.

BACKGROUND

This relates in general to Automated Transaction Machines (ATMs) and systems for automated financial or commercial transactions, sometimes known as an Automated Banking Machine or Automated Teller Machine.

Automated Transaction Machines are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions.

In carrying out these transactions or performing these functions, a variety of documents may be moved through the Automated Transaction Machine.

SUMMARY

This relates more particularly to a core module for an Automated Transaction Machine (ATM) including a housing having a plurality of cassette bays, a first document delivery system, and a second document delivery system. The first document delivery system is capable of transporting a document between the cassette and the second document delivery system via a first transport path, and the second document delivery system is capable of transporting a document between the first document delivery system and an other ATM location via a second transport path.

The core module may further include a plurality of first motors, each first motor associated with a respective one of the cassette bays for driving a picking device configured to pick at least documents from a respective cassette disposed in the respective cassette bay.

The core module may further include a plurality of second motors, each second motor associated with a respective one of the cassette bays for driving a push plate to position a document within a respective cassette disposed in the respective cassette bay.

The core module may further include a plurality grounding pins, each grounding pin disposed in a respective one of the cassette bays for interaction with a respective cassette disposed within the respective cassette bay for static discharge of the respective cassette. Each grounding pin may be in electrical communication with a ground. Each grounding pin may be in electrical communication with the ground through the housing.

The first document delivery may be generally horizontal relative to a ground level of the ATM, and the second document delivery system may be generally vertical relative to the ground level, and the other ATM location may include a dock location.

A shuttle may be disposed at the dock location in a generally vertical orientation relative to the ground level.

A reject bin may also be also disposed at the other ATM location and the core module may further include a gate disposed along the second transport path and proximate the other ATM location, the gate operable to direct a document traveling along the second transport path to either the dock location or the reject bin.

The core module may further include a document analysis area along the first transport path or between the first transport path and the second transport path or along the second transport path, the document analysis are including at least one hall sensor for detecting at least one of multiple documents in the first transport path or the second transport path and skewness of a documents in the first transport path or the second transport path. The gate may be operable to direct a document traveling along the second transport path to either the shuttle or the reject bin based upon an indication from the document analysis area.

An ATM of the core module may include a user interface for exchange of at least one document between a user and a cassette disposed in one of the cassette bays. The user interface may have a fascia gate separable gear drive having a fixed gear configured to mesh with a spring-loaded gear when moving from a separated position into an interlocking position with the spring-loaded gear. The ATM may include a motor for driving the fascia gate. The motor may be disposed with the core module.

Various aspects will become apparent to those skilled in the art from the following detailed description and the accompanying drawings.

DETAILED DESCRIPTION

Figure 1:
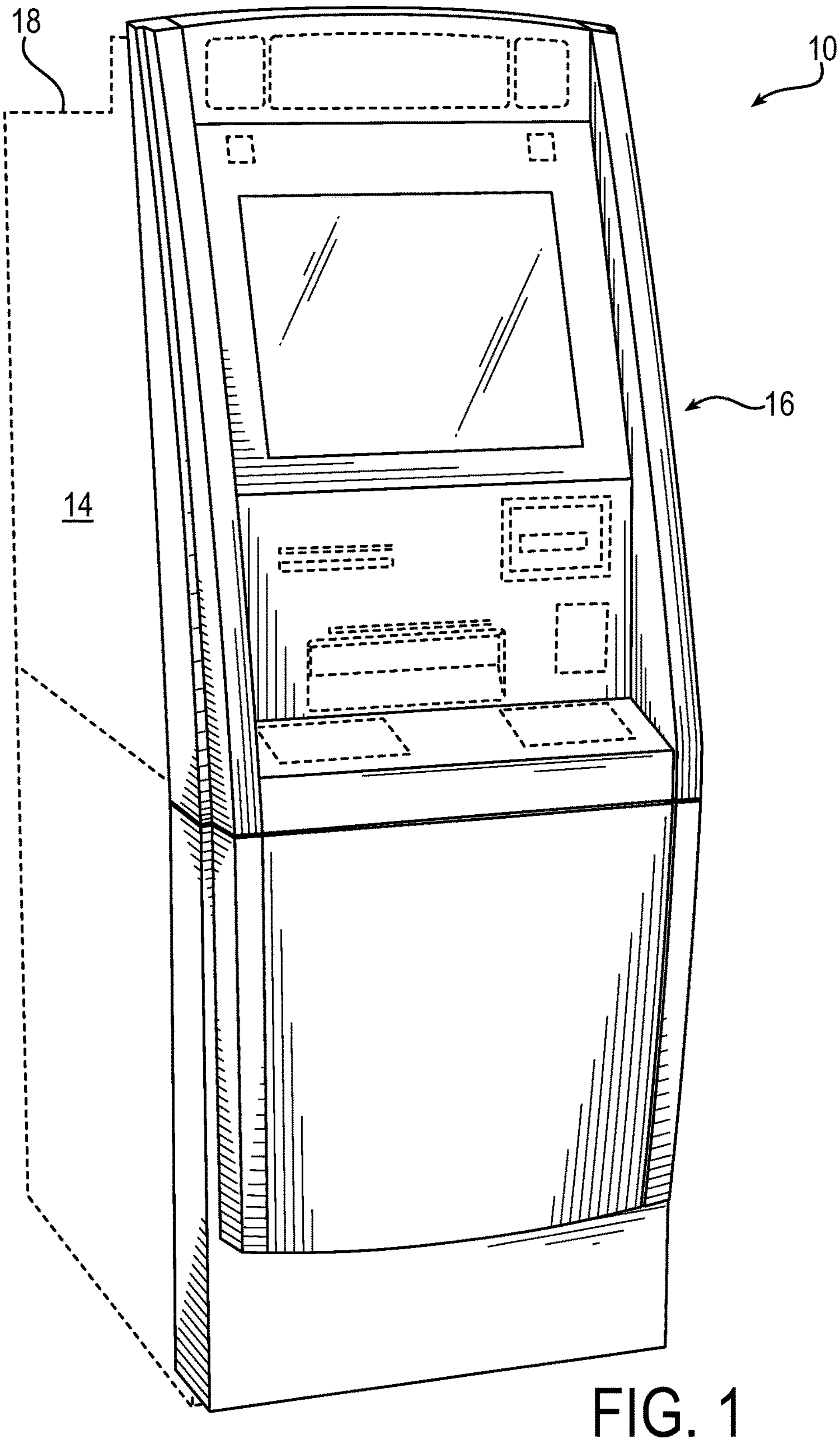
FIG. 1 is a perspective view of an automated transaction machine (ATM) of an exemplary embodiment.

With reference to the drawings, reference numerals designate identical or similar corresponding parts throughout the several views. However, the inclusion of like elements in different views does not necessarily mean that any particular embodiment includes any such element or that any particular embodiment includes all such elements.

The term “document”, as used herein, is to include currency, checks, bills, receipts, tickets, paper, and/or any other type of document that may be used with an Automated Transaction Machine (ATM).

The term “document analysis area” as used herein, is intended to include any location in an automated transaction machine where a document is analyzed for authenticity, quality, denomination, number of document(s), or any other characteristic of the document. The analysis may be performed by capturing an image of a portion of the document, capturing and evaluating an indicia on the document, capturing a video of the portion of the document, scanning a serial number, identifying an indicia on the document, and/or a combination thereof.

The term “controller”, as used herein, any piece of or portion of hardware, or software, or any piece or portion of logic, or a combination thereof. The piece or portion of hardware may include at least a processor and a portion of memory, and the memory includes an instruction to execute. The term “component”, as used herein, is generally any piece or portion of hardware of the Automated Transaction Machine that, wholly or in part, performs a function of the Automated Transaction Machine.

Further, it should be noted that certain terms used herein, such as “upper”, “lower”, “middle”, “upward”, “downward”, “top”, “bottom”, “front”, “back”, “side”, and the like, are used to facilitate the description of the embodiment(s) illustrated in the accompanying figures. Unless otherwise specified or made apparent by the context of the discussion, such terms should be interpreted as intended merely to facilitate the description of the features under discussion. Such terms are not intended as a limitation on the orientation in which components exist or may be used.

Figure 2:
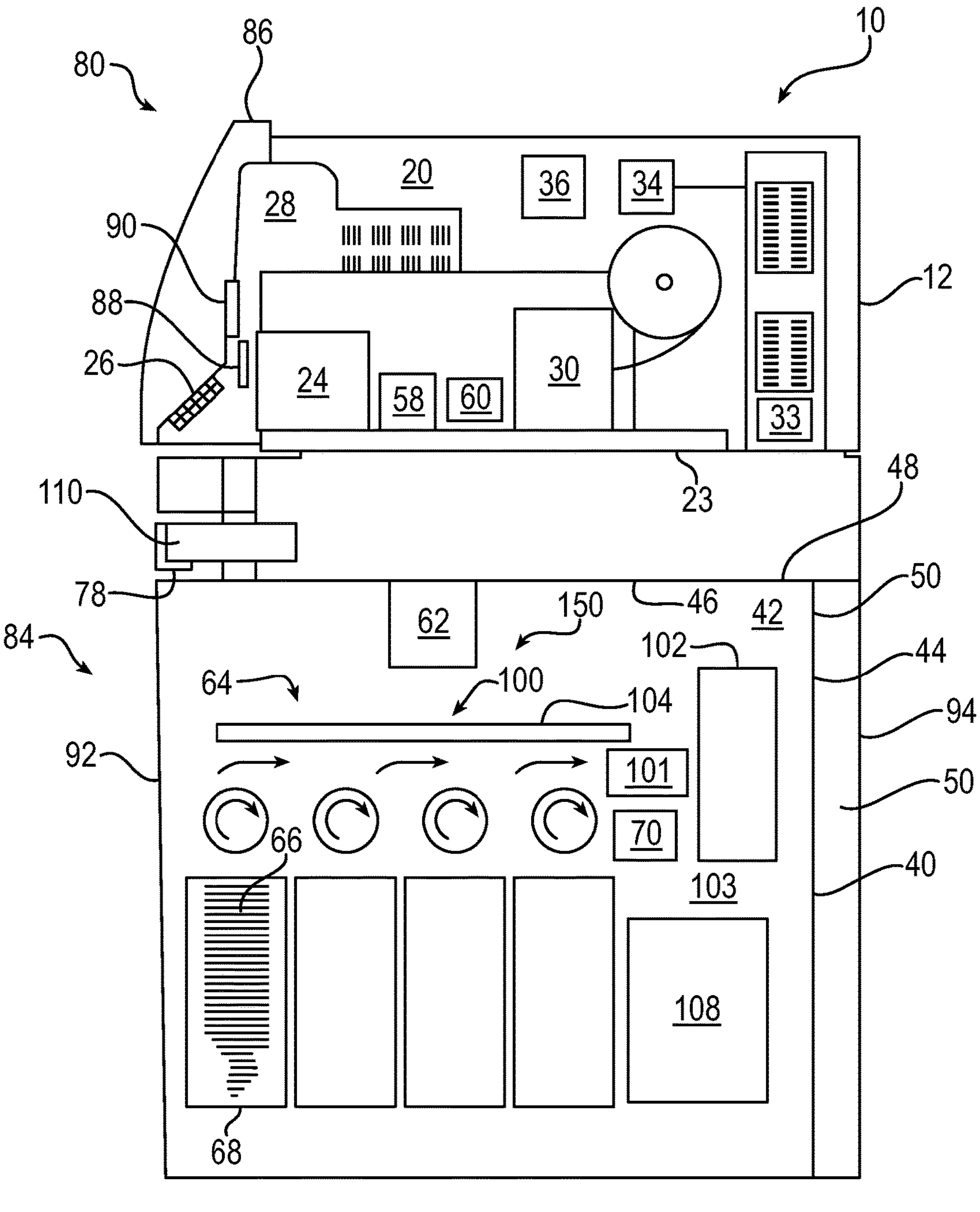
FIG. 2 is a side schematic view of the automated transaction machine of FIG. 1 shown in a rear-load configuration.
Figure 3:
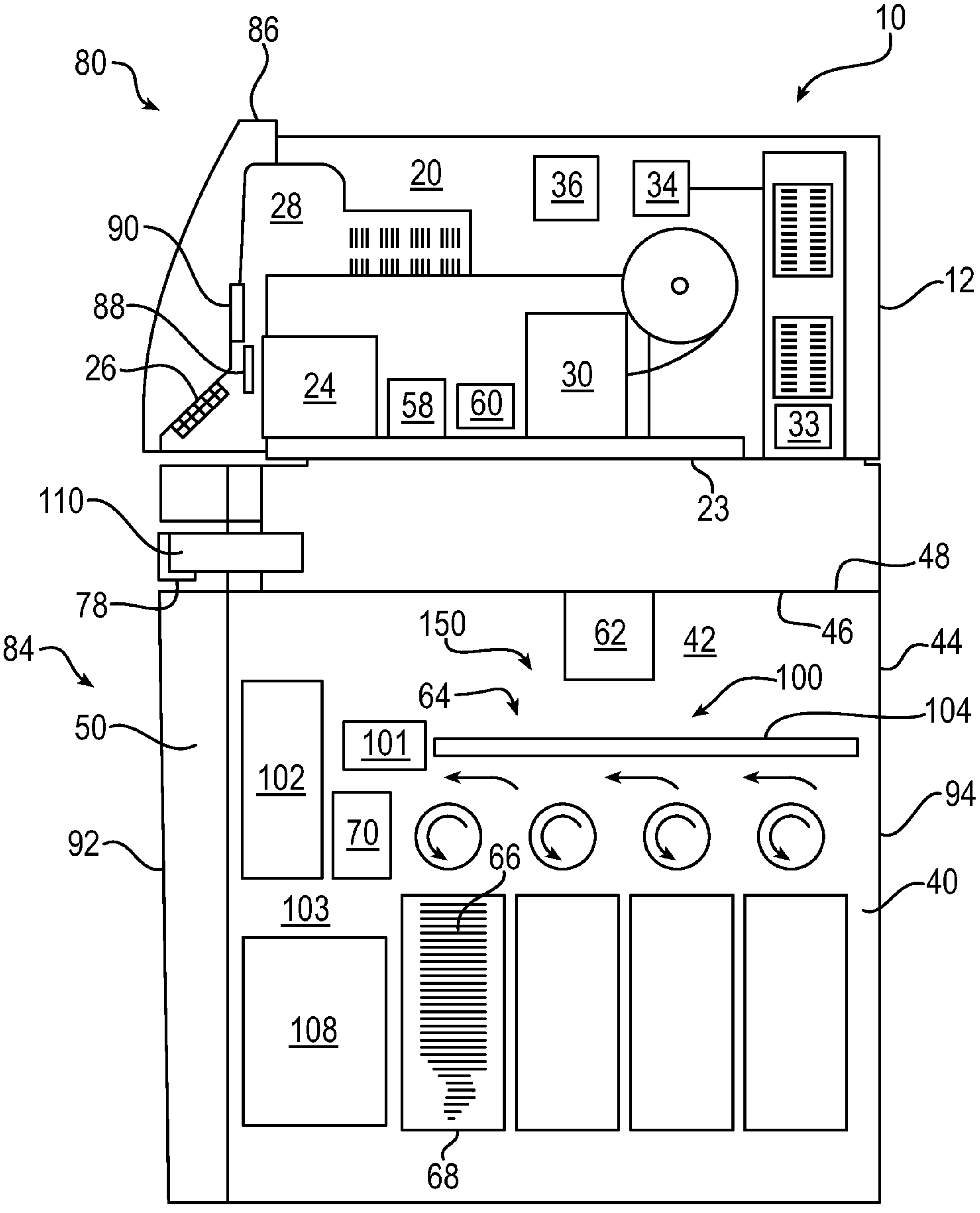
FIG. 3 is a side schematic view of the automated transaction machine of FIG. 1 shown in a front-load configuration.

Referring now to the drawings, and particularly to FIGS. 1-3, there is illustrated an automated transaction machine (ATM) 10 of a first exemplary embodiment. FIG. 1 illustrates the machine 10 in a perspective view. FIG. 2 illustrates a cross-sectional view of the machine 10, where the machine 10 is a rear-load configuration. FIG. 3 illustrates a cross-sectional view of the machine 10, where the machine 10 is a front-load configuration.

The ATM 10 includes a top housing 12 having side walls 14 and 16, and a top wall 18. The housing 12 encloses an interior area indicated at 20. The housing 12 has a front opening 110. In this exemplary embodiment, the rear of the housing 12 is closed by a rear wall. However, in other embodiments, the rear of the housing 12 may be accessible through an access door or similar device. The top housing 12 is used to house certain machine components such as, but not limited to, input devices, and output devices, among others.

Generally, the ATM 10 is an automated device that can dispense documents, receive documents, communicate with a financial institution, and communicate with a user, among others. It is to be appreciated and understood that the ATM 10 may be a stand-alone unit (as depicted), partly incorporated into a structure (e.g., interior wall, exterior wall, structure associated with a drive-in access system, structure associated with a walk-up system, and the like), among others. Additionally, the machine 10, as illustrated, includes an upper section (generally indicated at 80 in FIGS. 2 and 3) and a lower section (generally indicated at 84 in FIGS. 2 and 3), although such is not required. The upper section 80 and the lower section 84 can include various components, modules, and the like. In particular, the lower section 84 can include a core module 150.

With particular reference to FIGS. 2 and 3, the input devices include a card reader schematically indicated at 24. The card reader 24 is operative to read a customer’s card that includes data thereon. For example, the indicia on the card may correspond to information about the customer and/or information about a customer’s financial account, such as, but not limited to, the customer’s account number. In some embodiments, the card reader 24 is a card reader adapted for reading magnetic stripe cards, RFID cards, chip enabled cards, and/or any combination thereof.

Another input device in the exemplary embodiment includes input keys 26. The input keys 26 may be arranged in a keypad or keyboard. The input keys 26 may alternately or in addition include function keys or other types of devices for receiving manual inputs. It must be understood that in various embodiments other types of input devices may be used such as biometric readers, speech or voice recognition devices, inductance type readers, IR type readers, touch screens, and other devices capable of communicating with a person, article or computing device, radio frequency type readers and other types of devices which are capable of receiving information that identifies a customer and/or their account.

The illustrated exemplary embodiments of the machine 10 also include output devices providing outputs to the customer. In the exemplary embodiments, the machine 10 includes a display 28, where display 28 can be, but is not limited to being, an LCD, CRT and/or other type display that is capable of providing visible indicia to a customer. In other embodiments, output devices can include devices such as audio speakers, RF transmitters, IR transmitters, Wi-Fi devices or other types of devices that are capable of providing outputs which may be perceived by a user either directly or through use of a computing device, article, or machine. It must be understood that certain embodiments also include combined input and output devices, such as a touch screen display, that are capable of providing outputs to a user as well as receiving inputs.

The exemplary embodiment of the automated transaction machine 10 also includes a receipt printer schematically indicated at 30, although such is not required. The receipt printer is operative to print receipts for users reflecting transactions conducted at the machine. Embodiments can also include other types of printing mechanisms such as statement printer mechanisms, ticket printing mechanisms, check printing mechanisms and other devices that operate to apply indicia to media in the course of performing transactions carried out with the machine 10.

The automated transaction machine 10 further includes one or more processors schematically indicated at 33. The processor 33, alternately referred to as a computer or a controller, is in operative connection with at least one memory or data store, which is schematically indicated at 34. The processor 33 is operative to carry out programmed instructions to achieve operation of the machine in accomplishing transactions. The processor 33 is in operative connection with a plurality of the transaction function devices included in the machine.

The exemplary embodiment includes at least one communications device 36. The communications device 36 can be one or more of a plurality of types of devices that enable the machine 10 to communicate with other systems and devices for purposes of carrying out transactions. For example, the communications device 36 may include a modem for communicating messages over a data line or wireless network, with one or more other computers that operate to transfer data representative of the transfer of funds in response to transactions conducted at the machine 10. Alternately, the communications device 36 can include various types of network interfaces, line drivers, or other devices suitable to enable communication between the machine 10 and other computers and systems.

The exemplary ATM 10 further includes a safe or chest 40 enclosing a secure area 42. The secure area 42 is used in the exemplary embodiment to house critical components and/or valuable documents. Specifically, in the exemplary embodiment, the secure area 42 is used for housing currency, currency dispensers, currency stackers, and other machine components. For purposes of this disclosure, a cash dispenser shall include any mechanism that makes currency stored within the machine accessible from outside the machine.

The chest 40 includes a chest housing 44 including a top wall 46 having an upper surface 48 outside of the secure area 42. The top housing 12 is supported on the chest 40 such that the secure area 42 is generally below the interior area 20.

The chest 40 further includes a chest door 50 that is moveably mounted in supporting connection with the housing 12. The chest door 50 can be in a closed position or in an open position and can be generally closed to secure the contents of the chest 40. In other embodiments, the chest opening and door may have other configurations. In the exemplary embodiment, the chest door 50 can include a first device opening (not shown) therethrough and cooperates with mechanisms inside and outside the chest for passing currency or other items between a customer and devices located inside the chest 40.

In still another embodiment, the chest door 50 can be opened to allow a portion of the secure area 42 to be a lower rollout tray (not shown) to access a portion thereof. For example, the lower rollout tray can be used to insert/remove cassettes or cartridges 68 into the machine 10.

Referring FIGS. 2-14, the machine 10 also includes a plurality of sensing devices for sensing various conditions in the machine. These various sensing devices are represented schematically by component 58 for simplicity and to facilitate understanding. It should be understood that a plurality of sensing devices is provided in the machine for sensing and indicating to the processor 33 the status of devices within the machine 10.

Exemplary automated transaction machine 10 further includes a plurality of actuators schematically indicated at 60 and 62 respectively. The actuators may comprise a plurality of devices such as motors, solenoids, cylinders, rotary actuators and other types of devices that are operated responsive to the processor 33. It should be understood that numerous components within the automated transaction machine 10 are operated by actuators positioned in operative connection therewith. Actuators 60 and 62 are shown to schematically represent such actuators in the machine 10 and to facilitate understanding.

The machine 10 further includes at least one dispenser mechanism 64 housed in secure area 42. The dispenser mechanism 64 is operatively responsive to the processor 33 to pick documents from a stack of documents 66 housed in one or more canisters which may be alternatively referred to herein as cassettes or cartridges 68. The dispenser mechanism 64 includes a first document delivery system 100 that transports the document from the cassette 68 to a document analysis area 101 via a first transport path 104. It is noted and must be understood that the document analysis area 101 may lie along the first transport path 104, lie along a subsequent transport path, or be separate from the transport path. After being analyzed by the document analysis area 101 or passing through the document analysis area 101, the document may be collected or passed along. The picked documents may be arranged in a stack by an accumulator mechanism 70 in a shuttle 102, where the shuttle is moveable to deliver the stack of documents to a customer at an opening 110. If the document(s) are to be discarded after the analysis at the document analysis area 101, the document(s) are directed to a retract/reject bin 108. It is to be appreciated that the retract/reject bin 108 can include a first compartment for rejected documents and a second compartment for retracted documents. Moreover, it is to be appreciated that there can be one or more bins or compartments within bins for designation of the placed document(s).

In response to operation of the processor 33, when a desired number of document(s) have been collected in a stack, the stack is moved through the opening 110 via the shuttle 102 and, in particular, via a belt system, for example, coupled to one or more platen within the shuttle 102.

Figure 15:
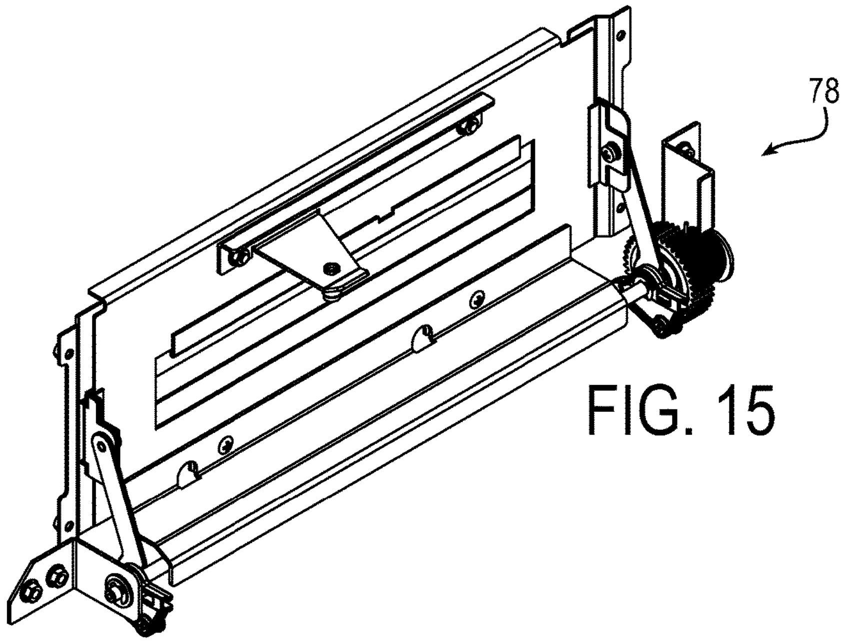
FIG. 15 is a rear isometric view of the fascia gate of the ATM of FIG. 1.
Figure 16:
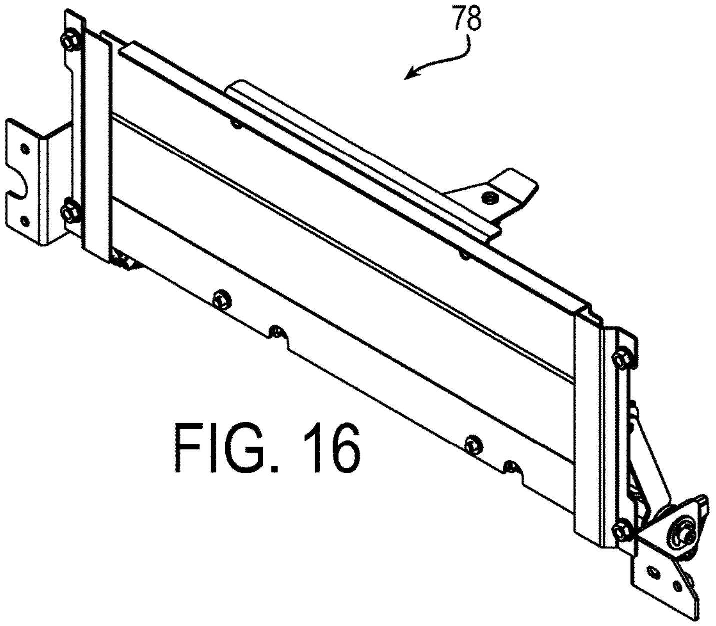
FIG. 16 is a front isometric view of the fascia gate of FIG. 11.

As the stacks are delivered through the opening 110, the controller 32 operates a suitable actuating device to operate a gate 78, see FIGS. 15 and 16, so as to enable the stack of document(s) to pass outward through the opening 110. As a result, the user is enabled to receive the documents from the machine 10. After a user is sensed as having removed the stack from the opening, the controller 32 can operate to close the gate 78 so as to minimize the risk of tampering with the machine 10. If a pre-defined duration of time passes, the shuttle can return to a user interface location and direct the document or stack to the retract/reject bin 108.

With particular reference to FIGS. 2 and 3, in this exemplary embodiment, the ATM 10 further includes an optional upper rollout tray 23. The upper rollout tray 23 is moveably mounted in supporting connection with slides. The slides enable movement of the upper rollout tray 23 between the extended position and a retracted position within the interior area 20 of the top housing 12. The upper rollout tray 23 may have several upper machine components supported thereon including card reader 24, input keys 26, display 28, receipt printer 30, and other components as appropriate for the particular ATM 10.

This exemplary embodiment further includes an upper fascia 86 in supporting connection with the upper rollout tray 23. The upper fascia 86 may include user interface openings such as a card opening 88 through which a customer operating the machine 10 may insert a credit, debit or other card, or a receipt delivery slot 90 through which printed transactions receipts may be delivered to the customer. The upper rollout tray 23 moveably supports upper fascia 86 relative to the top housing 12 so that upper fascia 86 is movable between a first position covering the front opening and a second position in which the upper fascia is disposed from the front opening.

As illustrated in FIGS. 1-3, in the operative condition of the ATM 10, the upper rollout tray 23 is retracted into the interior area 20 of the housing 12. The upper fascia 86 operates to close front opening and provide an attractive appearance for ATM 10, while allowing a customer to input information and receive outputs from ATM 10. Moreover, the lower rollout tray (not shown) of the secure area 42 is in a retracted position into the secure area 42 of the machine 10.

The cassette(s) 68 can be inserted from a front of the machine 10 indicated at 92 in which the front 92 is opposite to a rear of the machine 10 indicated at 94. Such a load configuration can be referred to as a "front-load" automated transaction machine 10. In such a front-load configuration, the cassettes 68 can be loaded via the lower rollout tray (not shown) that slides in and out of the secure area 42. It is to be appreciated and understood that the cassette(s) 68 can be inserted from a rear of the machine 10 indicated at 94. Such a load configuration can be referred to as a "rear-load" automated transaction machine 10. In such a rear-load configuration, the cassettes 68 can be loaded via the lower rollout tray (not shown) that slides in and out of the secure area 42.

The first document delivery system 100 can transport, via the first transport path 104, a document from at least one cassette 68 to the document analysis area 101. The document analysis area 101 can analyze certain aspects of the documents and/or capture an image of the document. Based on one or more parameters of the machine 10, the document can be transported from the document analysis area 101 to either a retract/reject bin 108 or to a shuttle 102, both generally in ATM location 103. The transport of the document from the document analysis area 101 can be via a second document delivery system 106, see FIGS. 4, and 5. A gate 112 can direct the document either to the shuttle 102 or the retract/reject bin 108 based on a parameter detected by the document analysis area 101. By way of example, the parameter can be at least one of a detection of a misfeed, detection of more than one document, detection of a counterfeit document, an error or a fault of the machine 10, a non-capturing of an image of the document, among others.

The retract/reject bin 108 can include a first section that receives documents that are rejected and a second section that receives documents that are retracted.

It is to be appreciated that the first document delivery system 100, the second document delivery system 106, and/or additional document delivery systems can include various components, mechanical devices, and electronics such as, but not limited to, feed rollers, belt drives, belts, axles, shafts, drive shafts, platen, rollers, plates, gears, and the like. It is to be understood that various techniques can be employed to transport the document from a first location to a second location either within the machine 10 or to an exterior of the machine 10. Moreover, it is to be appreciated that two or more document delivery systems can be employed with the subject innovation and/or two or more transport paths can be employed with the subject innovation.

The document analysis area 101 is a location within the automated transaction machine 10 that can analyze certain aspects and/or capture an image of a portion or an area of the document. The first document delivery system 100 can transport a document from the cassette 68 to the document analysis area 101 and the second document delivery system 106 can transport the document from the document analysis area 101 to an other ATM location (e.g., the ATM location 103, retract/reject bin 108, shuttle 102, among others). In the occurrence of image capture, in order to capture an image of the document, an unobstructed line of sight of the document is necessary which translates into the document analysis area being free of feeder rolls, belts, and/or any other components used with a document delivery system. By way of example and not limitation, the document analysis area 101 can include one or more scan components, positioned in an area that has an unobstructed line of sight, that are configured to capture an image of the document or a portion of the document.

Figure 4:
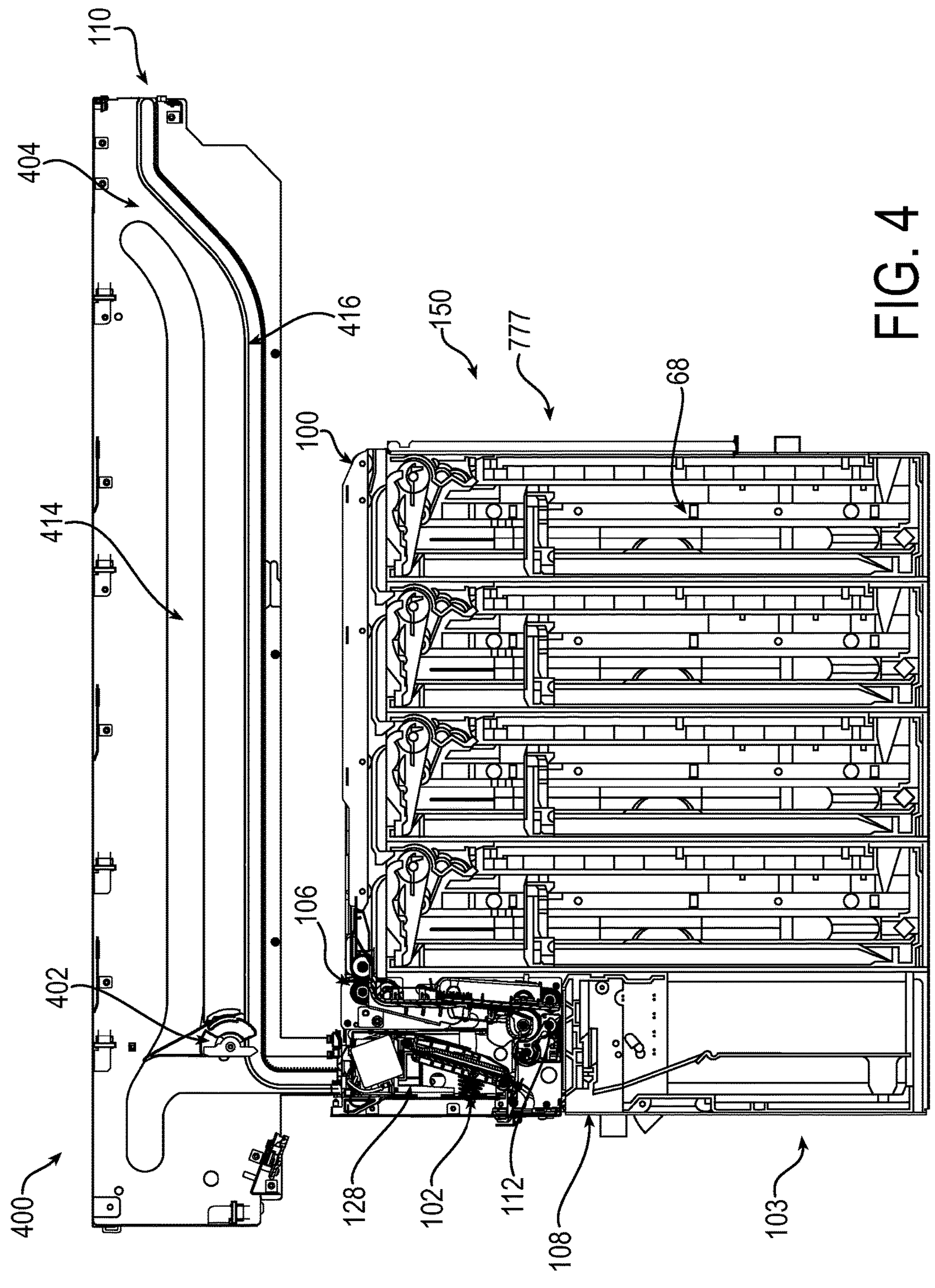
FIG. 4 is a cross-sectional view of the core module of the automated transaction machine of FIG. 2 with a rear-load track system.
Figure 5:
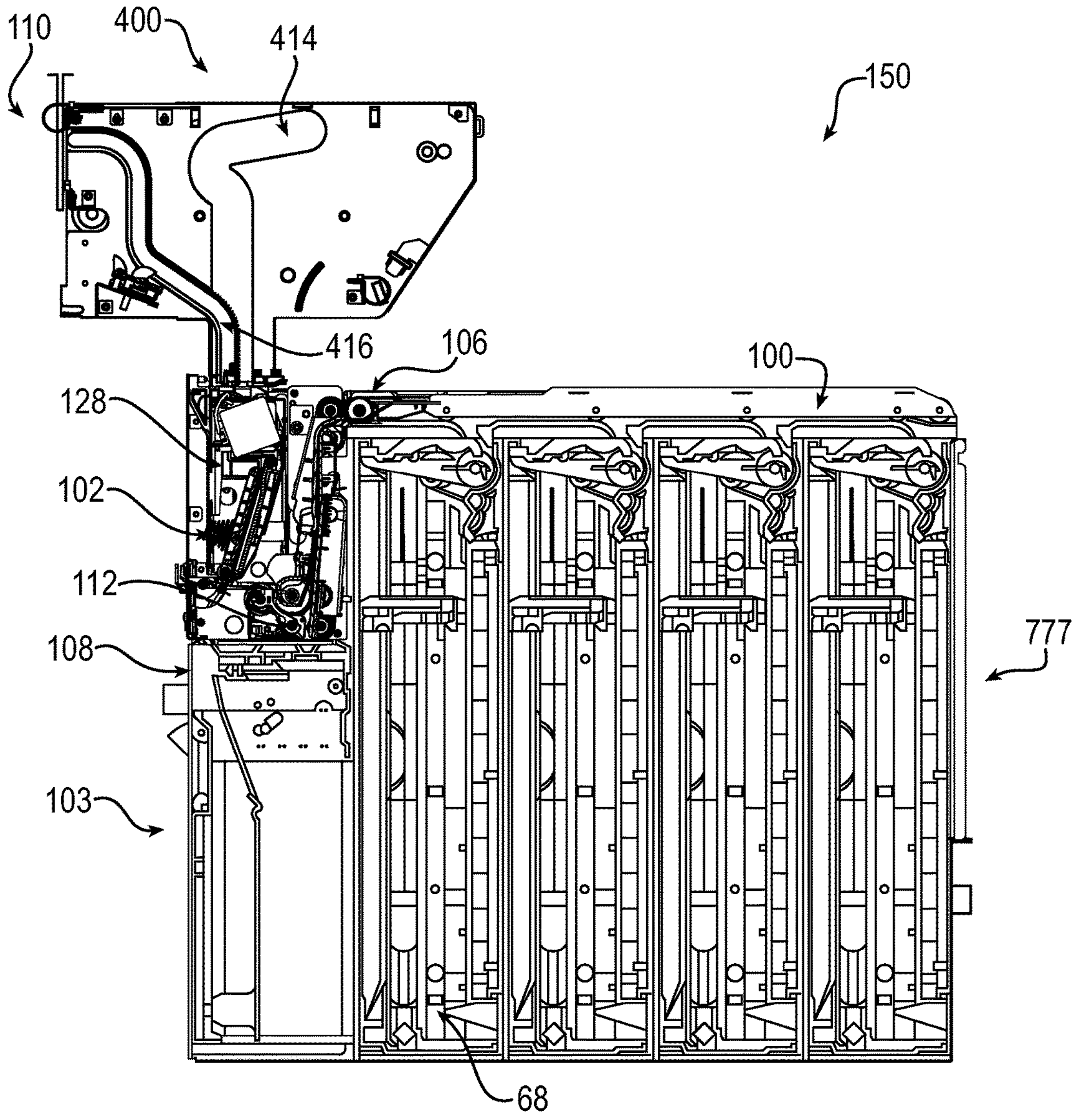
FIG. 5 is a cross-sectional view of the core module of the automated transaction machine of FIG. 3 with a front-load track system.
Figure 6:
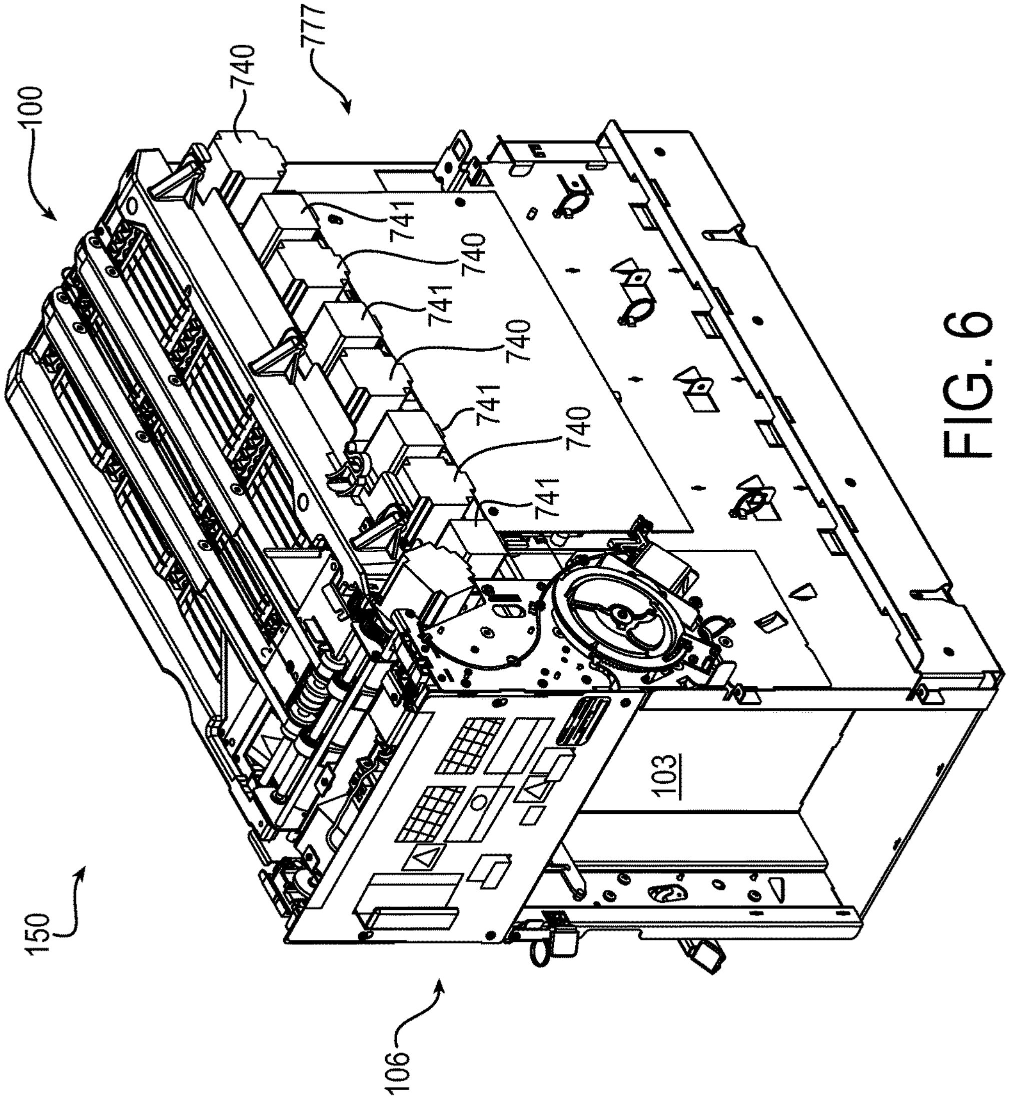
FIG. 6 is a top front isometric view of the core-module of the ATM of FIG. 1.
Figure 7:
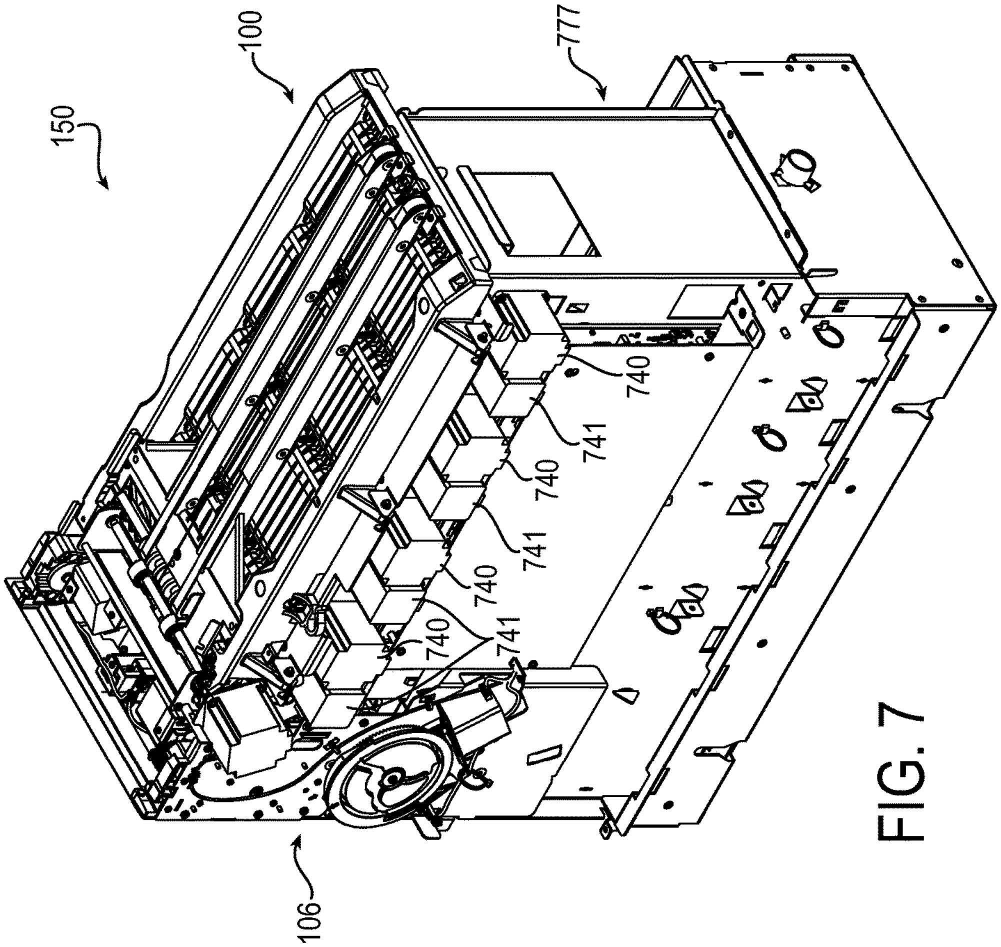
FIG. 7 is a top rear isometric view of the core-module of FIG. 6.
Figure 8:
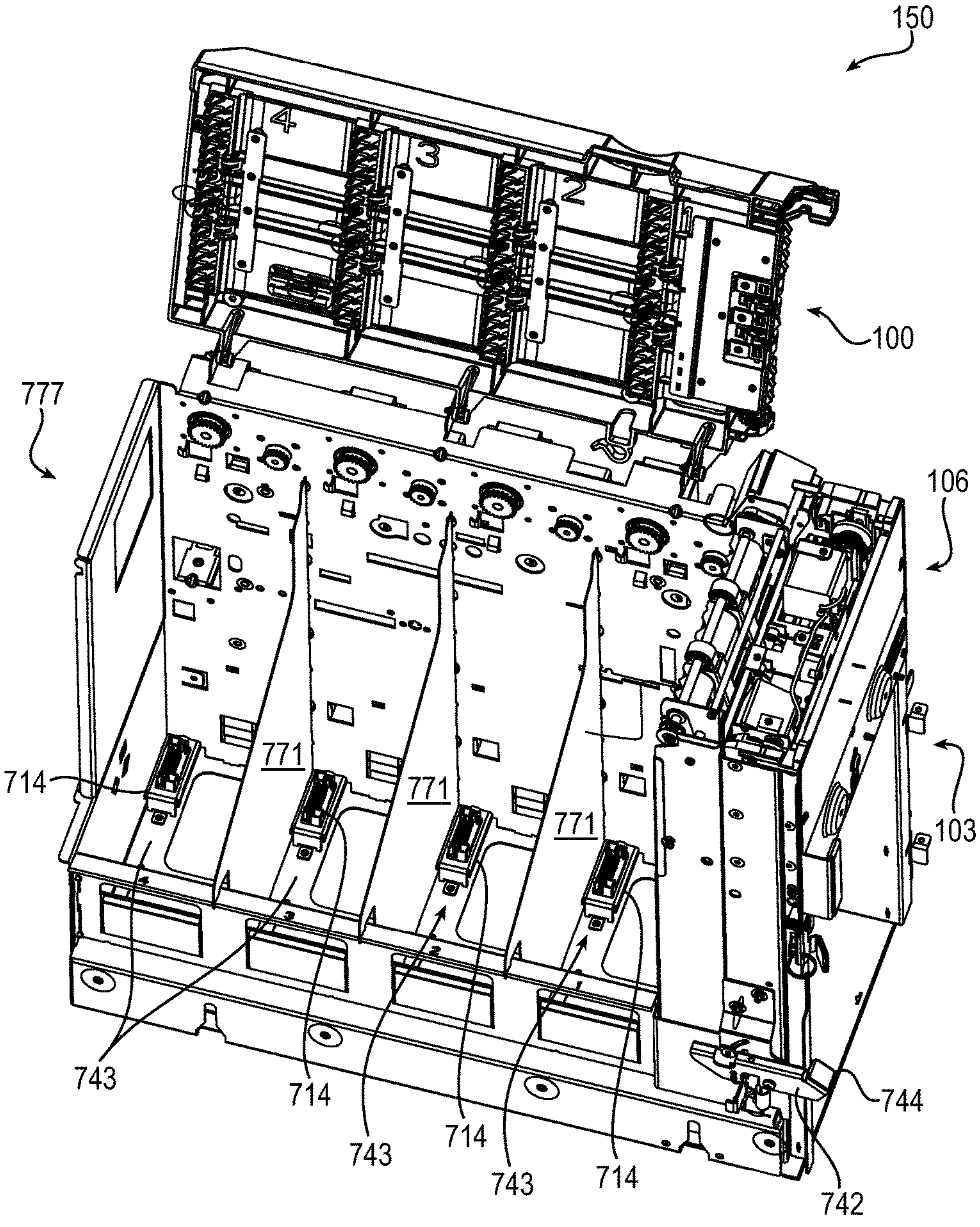
FIG. 8 is a top side isometric view of the core-module of FIG. 6.
Figure 9:
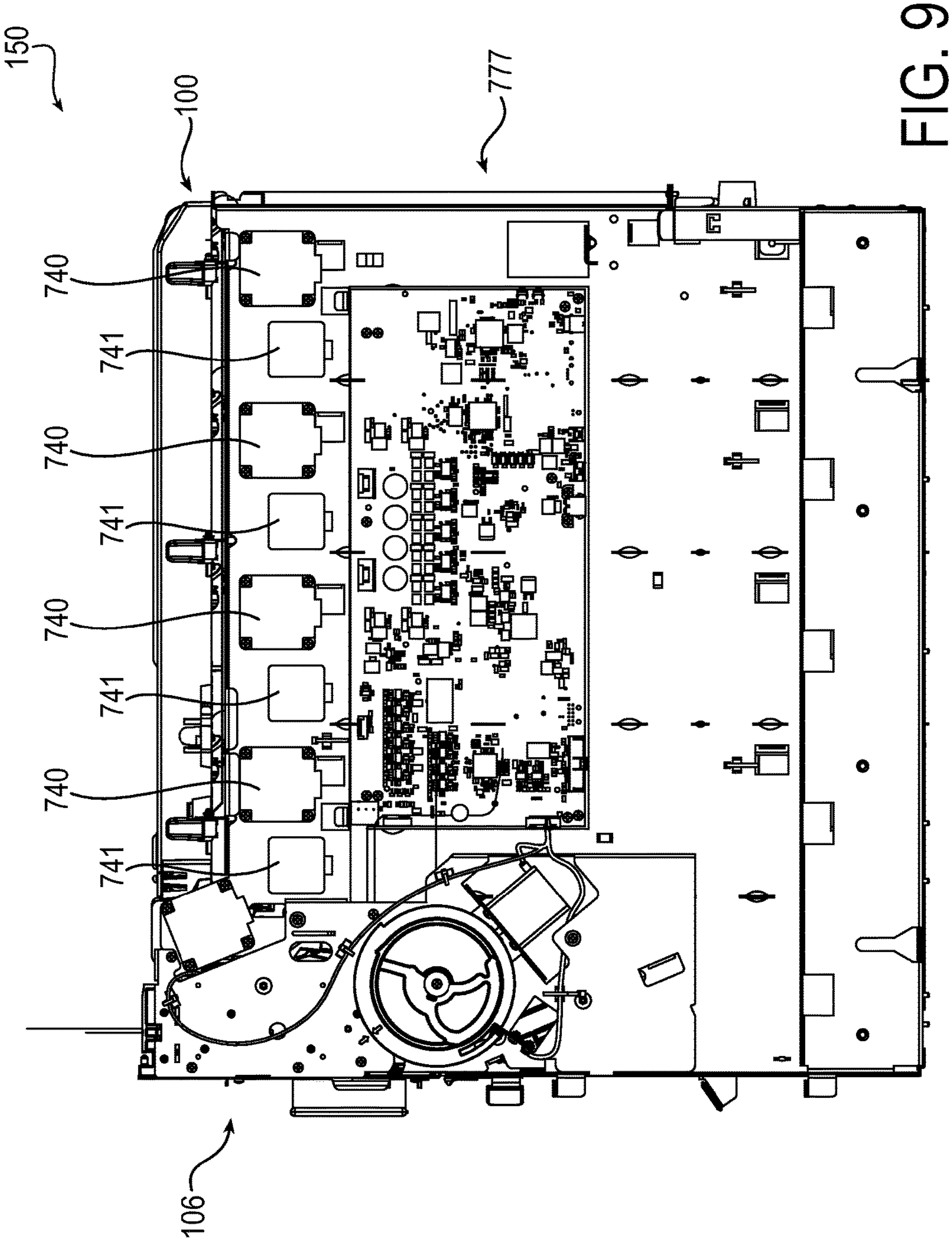
FIG. 9 is a right side view of the core module of FIG. 6.
Figure 10:
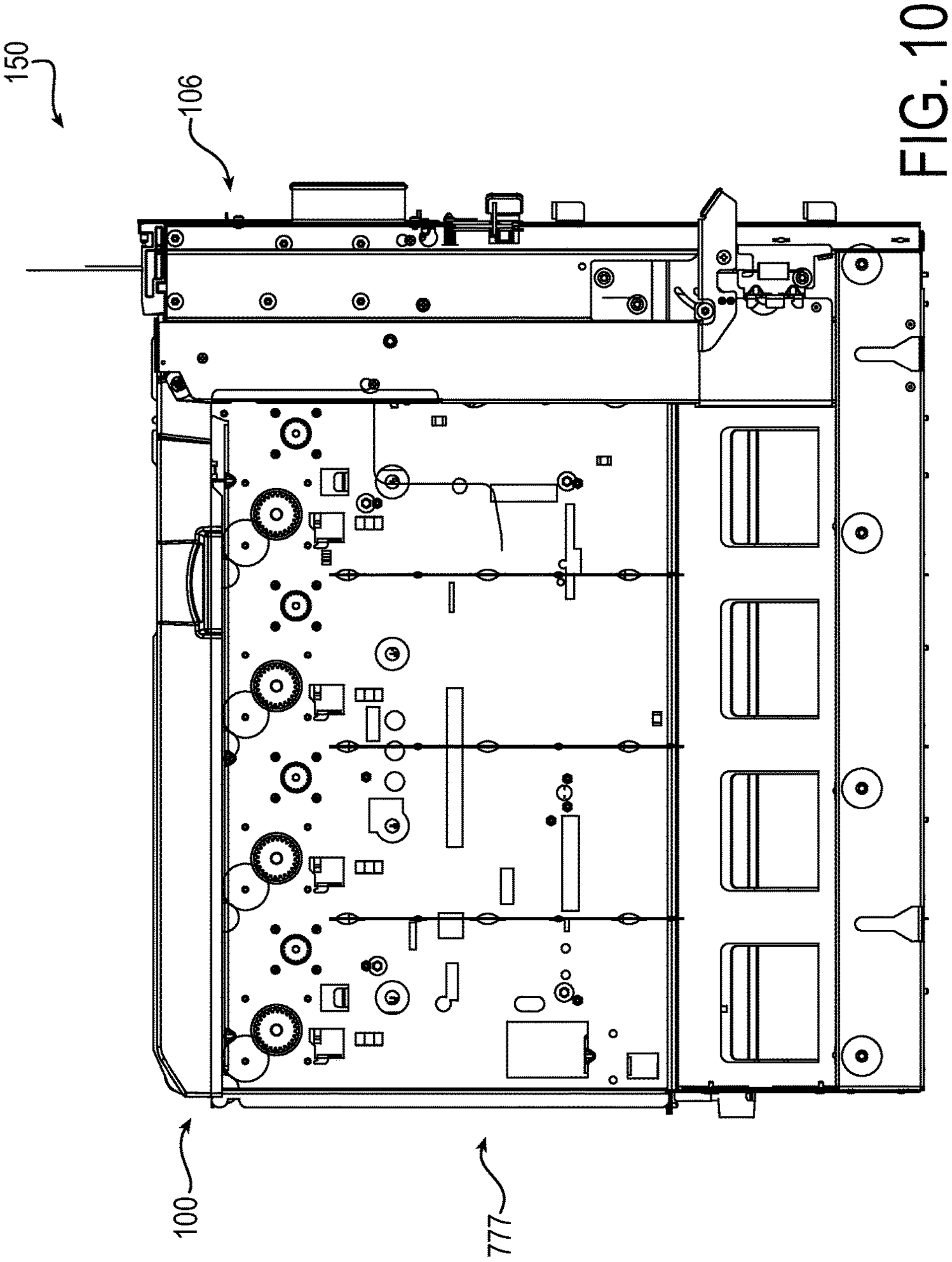
FIG. 10 is a left side view of the core module of FIG. 6.
Figure 11:
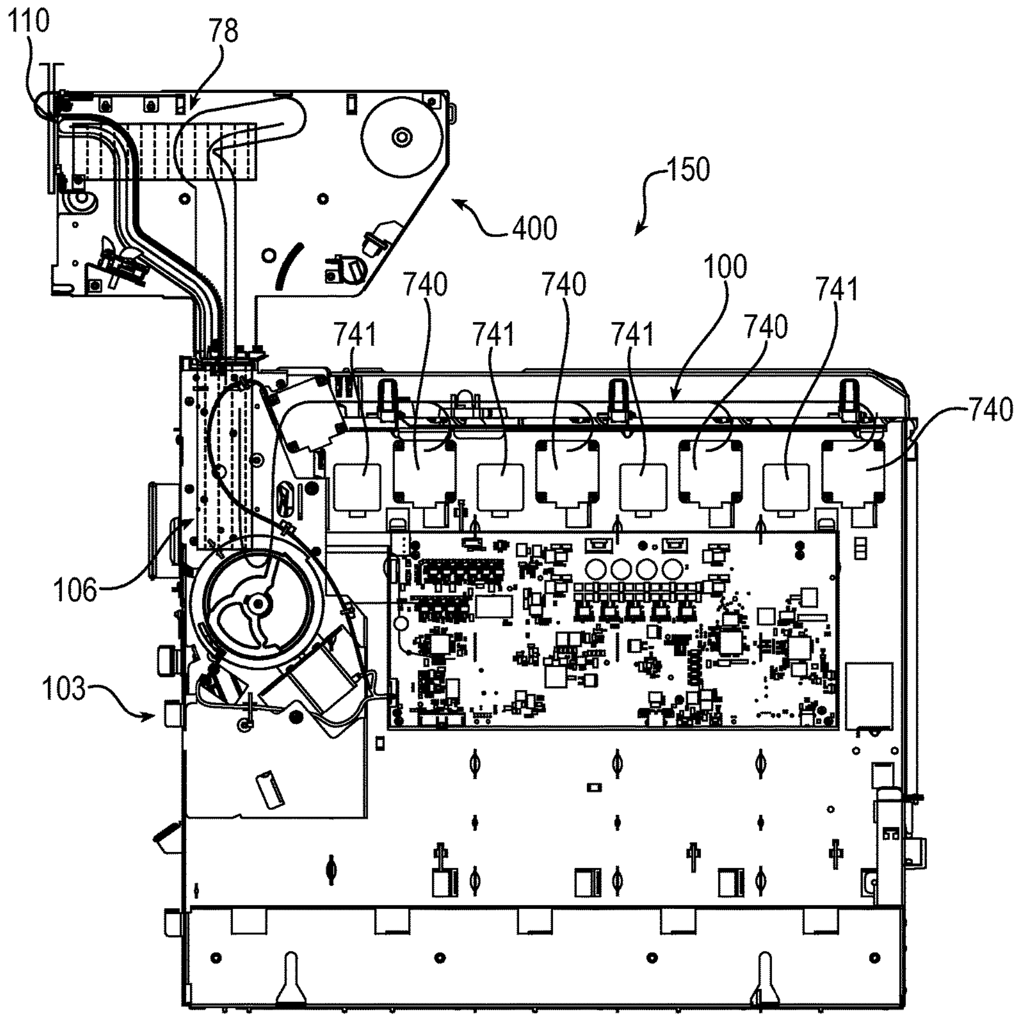
FIG. 11 is a side operational schematic view of the core module with front load track system of FIG. 5.
Figure 12:
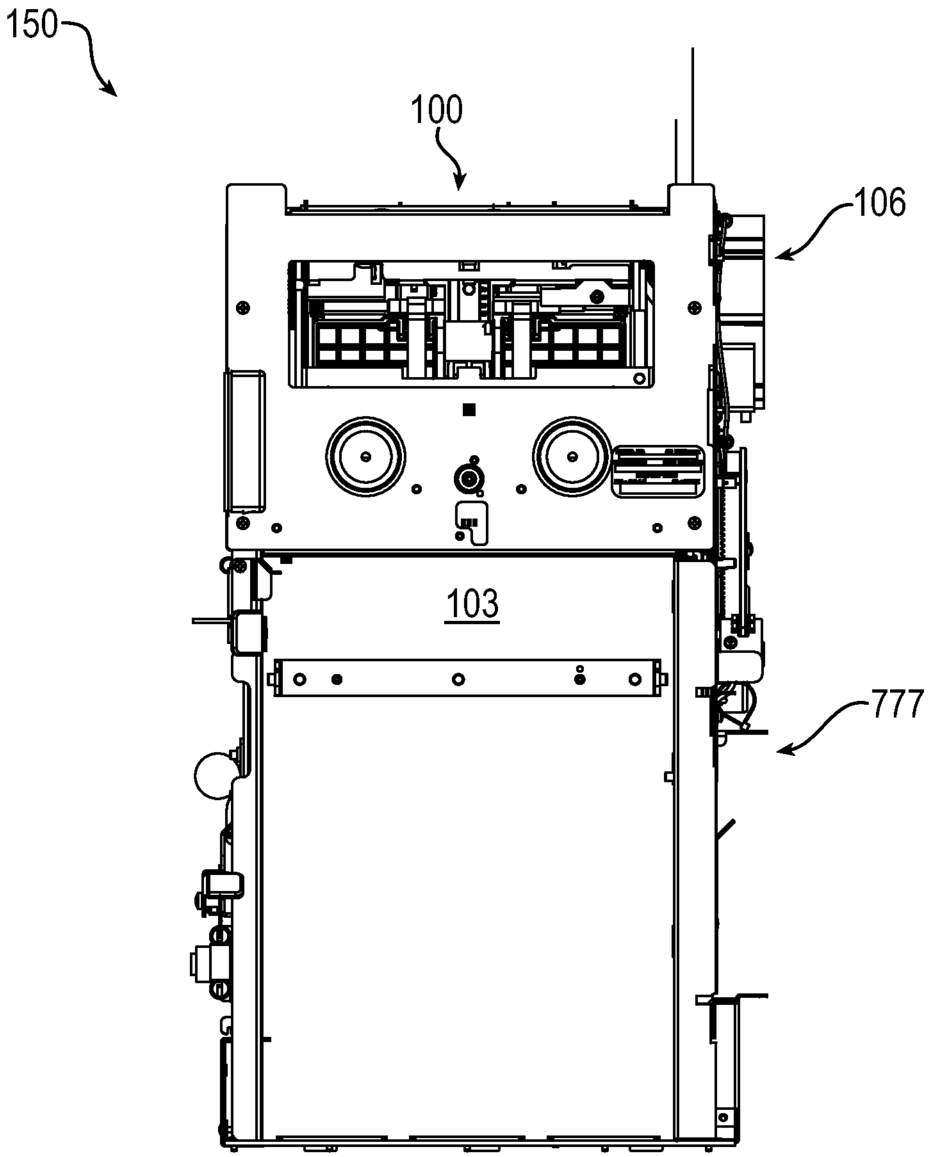
FIG. 12 is an end view of the core module of FIG. 6.
Figure 13:
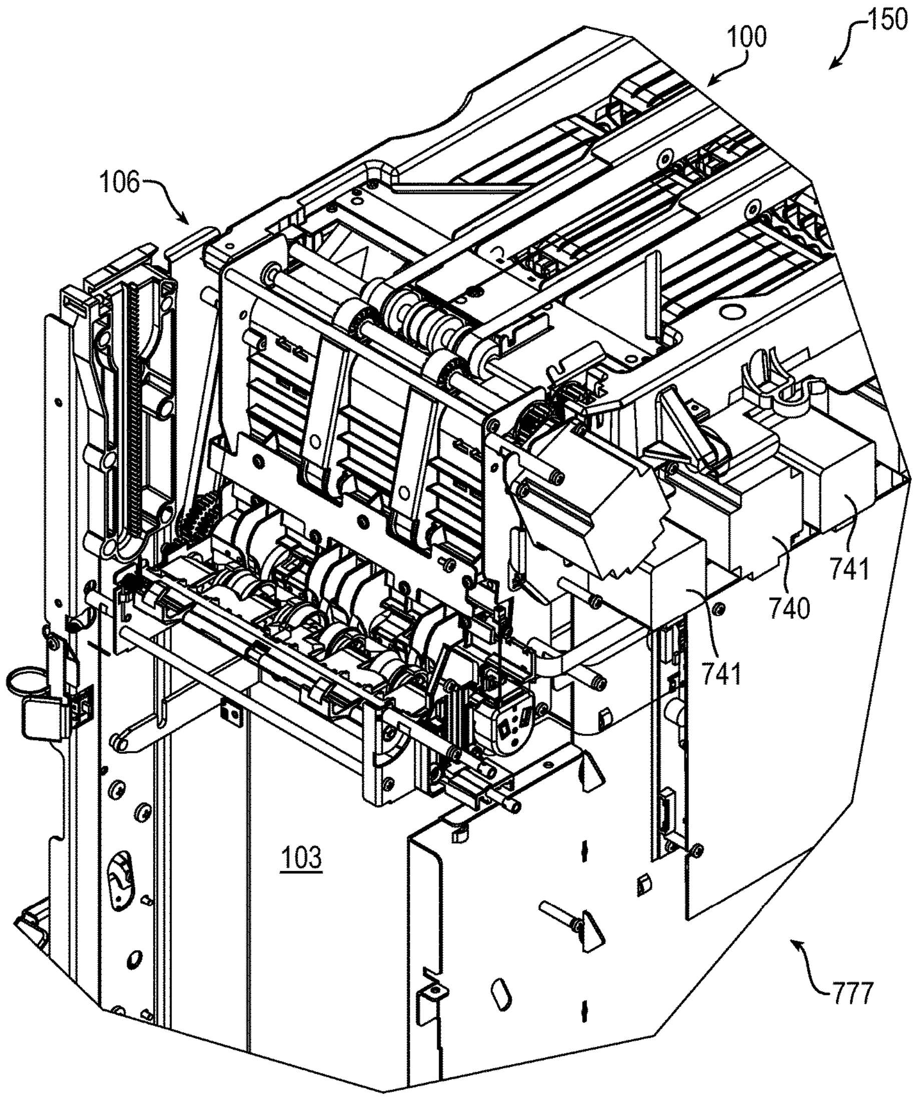
FIG. 13 is a partial side isometric view of the core module of FIG. 6 with the end plate removed.
Figure 14:
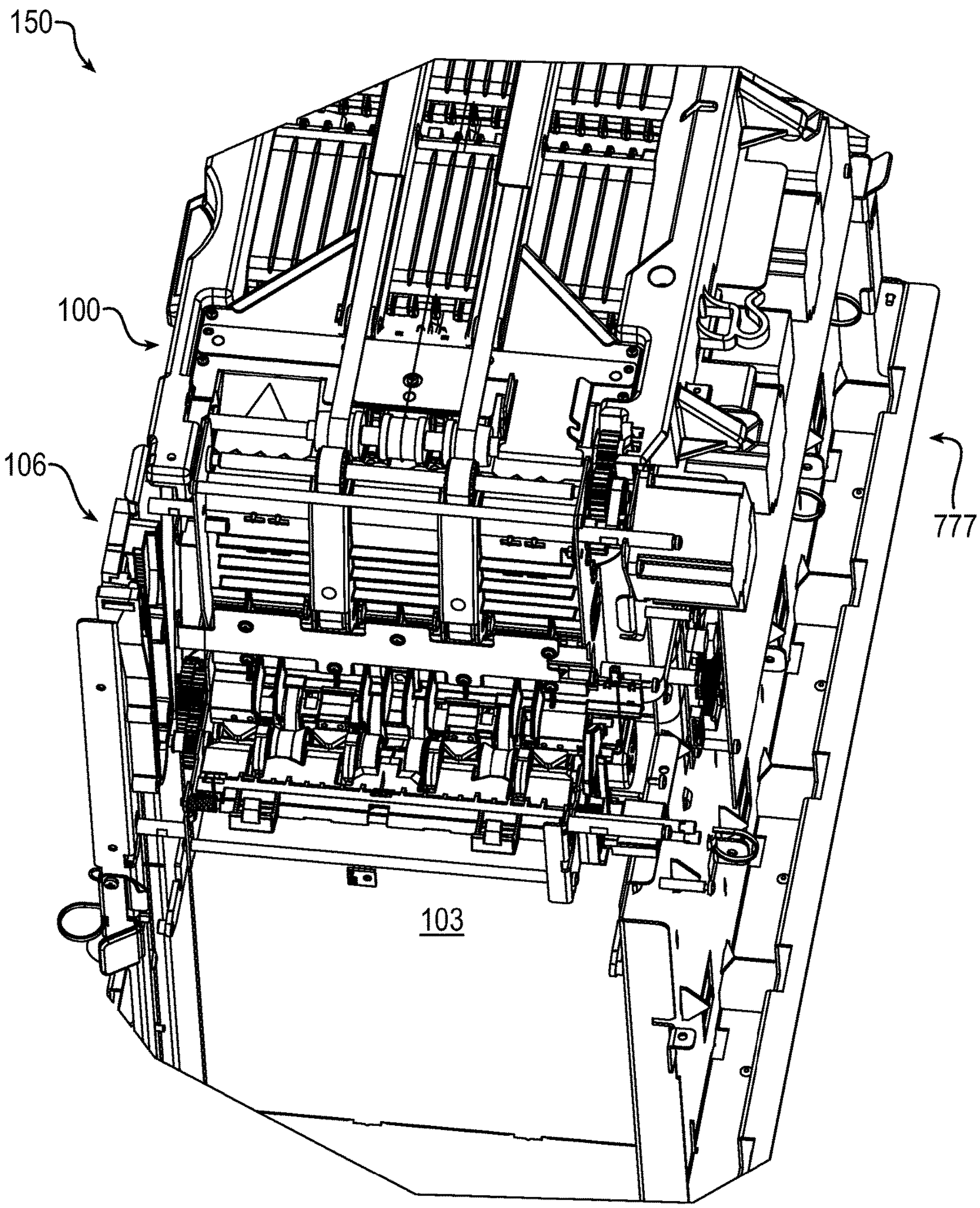
FIG. 14 is a partial top isometric view of the core module of FIG. 6 with the end plate removed.

In particular, FIGS. 4-5 are cross-sectional views of the core module 150 of the machine 10, where the core module 150 is a front-load configuration in FIG. 5 and the core module 150 is a rear-load in FIG. 4. The core module 150 is connected to an optional track system 400. The track system 400 can include a junction switch 402 that allows the shuttle 102 to travel from a dock position (as illustrated) at a dock location to a delivery position 404 at user interface location 126 at opening 110.

The automated transaction machine 10 includes the following: the cassette 68 that stores a document; a first document delivery system 100 that transports the document from the cassette 68 to a document analysis area 101; a second document delivery system 106 that transports the document from the document analysis area 101 to a shuttle 102, where the second document delivery system 106 (see at least FIGS. 4 and 5) creates a stack of the document within the shuttle 102, the shuttle 102 being configured to travel on a track system 400 from a dock location to a user interface location 126 at delivery position 404 and from the user interface location 126 at delivery position 404 to the dock location. The shuttle 102 may be in a substantially vertical orientation at the dock location compared to a ground-level of the automated transaction machine 10 and the shuttle 102 may be in a substantially horizontal orientation at the user interface location 126 at delivery position 404 compared to the ground-level. The track system 400 includes the following: a first channel 413, a second channel 414 opposite the first channel 413, a third channel 415, a fourth channel 416 opposite the third channel 415, and a junction switch 402 that directs the shuttle 102 from a first path of travel to a second path of travel when a portion of the first channel 413 or second channel 414 overlap with portion of the third channel 415 or fourth channel 416.

At least one embodiment of the core module 150 includes a plurality of cassette bays 743 to receive a respective plurality of cassettes 68, the cassettes 68 configured to hold and facilitate dispensing/receiving of documents. The picking mechanism, such as dispenser mechanism 64, is configured to pick at least one document from a cassette 68 and facilitate moving the at least document from the cassette 68 to the first documents delivery system 100, shown as a horizontal transport. The horizontal transport (first document delivery system 100) facilitates moving the at least one document from one of the plurality of cassettes 68 to the second document delivery system 106, shown as a vertical transport. The vertical transport (second document transport system 106) facilitates moving the at least one documents from the horizontal transport (first document delivery system 100) to the shuttle 102. The shuttle 102 facilitates moving the at least document from the vertical transport (second document transport system 106) to an ATM document dispensing port (the opening 110).

An additional embodiment includes a foot-lever module latch that is configured to release the core module end door and thereby allow the end door to pivot to an open position. In an embodiment, the foot-lever module latch has a configuration that includes a body portion and a flange portion that allows it to be kicked or foot-activated by a user to thereby allow the front panel to pivot or swivel to an open position. With reference to at least FIG. 8, a foot-lever flange portion 744 is positioned angularly to a foot-flange body portion 742. Upon depressing the foot-lever flange portion 744, the foot-lever body portion 742 is rotatably displaced thereby releasing front panel frame from a closed position to an open position An additional embodiment the fascia-gate 78, see FIGS. 15 and 16 including a separable gear drive that can generally be understood as a fixed gear relative to the fascia gate 78 and configured to mesh with a spring-loaded gear when moving from a separated position into an interlocking position with the spring-loaded gear. The spring-loaded configuration has three-space tolerance, i.e., movement in the X, Y, and Z 3-space directions, that facilitates meshing with the fascia-gate fixed gear as the fascia-gate separable gear drive moves into a closed position and thereby meshes with the spring-loaded gear.

First Motors 740 and Second motors 741 are radially disposed from and fixedly secured to sub-assembly frame or core housing 777. The plurality of first motors 740 are each associated with a respective one of the cassette bays 743 for driving a picking device (part of The dispenser mechanism 64) configured to pick at least documents from a respective cassette 68 disposed in the respective cassette bay 743. The plurality of second motors 741 are each associated with a respective one of the cassette bays 743 for driving a push plate (not shown) to position a document within a respective cassette 68 disposed in the respective cassette bay 743.

The core housing 777 includes cassette connectors 714 each associated with a respective one of the cassette bays 743 for mating with a respective cassette 68. In at least one embodiment the connectors 714 enable communication between the cassettes 68 and another component in the ATM 10. The core housing 777 includes cassette-wall dividers 771 that are fixedly attached to the core housing 777 create physical separation between the cassette bays 743, although such is not required.

With reference to FIGS. 15 and 16, the fascia gate 78 includes a fascia gate separable gear drive. Fascia bracket is secured into position using nuts such that a planar portion of fascia bracket is flush against a planar portion of fascia gate 78. A glide door receives an end portion of a blind rivet extending through a long-arm-portion orifice of a gate arm link. A gate drive shaft passes through its duel-end components, as illustrated in the figure; specifically, the shaft passes through the left-arm gate, through a mounted shaft bracket, through a radial ball bearing, with all components being secured on the end of the shaft via a ring. A dowel pin acts to secure a rod element to the drive-gate shaft. On the opposing end this above-described end-of-shaft construction is the separable gear drive construction. The shaft passes through right magnet cam gate, through an arched portion of the gate arm link, through a gear, through right cam gate, through right-hand mount shaft bracket, through radial ball bearing, with all components being secured on the end of the shaft 6 via the ring. The gate arm link is secured to the fascia gate using a blind rivet, as shown in the figure, the gate arm link is secured to right magnet cam gate using a blind rivet as shown in the figure. Duel dowel pins are inserted into the shaft, as shown in the figure. A capture gate is secured to a fascia alignment bracket via hex nuts. The fascia alignment bracket is fixedly attached to a bore sleeve via a machine screw. An alignment bracket is secured to the capture gate using machining screws, as shown in the figure.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

In certain embodiments of an Automated Transaction Machine (ATM), a shuttle receives a stack of documents. The shuttle is moveable between a dock location and a user interface location along a track system. The shuttle may be utilized with a rear-load configuration or a front-load configuration in which the track system has a travel path between the dock location to the user interface location. Although, none of which is required.

While principles and modes of operation have been explained and illustrated with regard to particular embodiments, it must be understood, however, that this may be practiced otherwise than as specifically explained and illustrated without departing from its spirit or scope.

What is claimed is:

1. A core module for an Automated Transaction Machine (ATM) comprising:

a housing including a plurality of cassette bays;

a first document delivery system; and a second document delivery system, the first document delivery system for transporting a document between the cassette bays and the second document delivery system via a first transport path, the second document delivery system for transporting the document between the first document delivery system and an other location with the ATM via a second transport path, a plurality of first motors, each first motor associated with a respective one of the cassette bays for driving a picking device configured to pick at least documents from a respective cassette disposed in the respective cassette bay, and a plurality of second motors, each second motor associated with a respective one of the cassette bays for driving a push plate to position the document within a respective cassette disposed in the respective cassette bay, and a plurality grounding pins, each grounding pin disposed in a respective one of the cassette bays for interaction with a respective cassette disposed within the respective cassette bay for static discharge of the respective cassette.

2. The core module of claim 1 where each grounding pin is in electrical communication with a ground.

3. The core module of claim 2 where each grounding pin is in electrical communication with the ground through the housing.

4. The core module of claim 1 where the first document delivery system is generally horizontal relative to a ground level of the ATM, and where the second document delivery system is generally vertical relative to the ground level, and where the other ATM location includes a dock location.

5. The core module of claim 4 where a shuttle is disposed at the dock location in a generally vertical orientation relative to the ground level.

6. The core module of claim 4 where a reject bin is also disposed at the other ATM location, the core module further comprising:

a gate disposed along the second transport path and proximate the other ATM location;

where the gate is operable to direct a document traveling along the second transport path to either the dock location or the reject bin.

7. The core module of claim 6 further comprising:

a document analysis area along the first transport path or between the first transport path and the second transport path or along the second transport path, the document analysis area including at least one hall sensor for detecting at least one of multiple documents in the first transport path or the second transport path and skewness of a documents in the first transport path or the second transport path, where the gate is operable to direct a document traveling along the second transport path to either the shuttle or the reject bin based upon an indication from the document analysis area.

8. The core module of claim 1 further comprising:

a document analysis area along the first transport path or between the first transport path and the second transport path or along the second transport path, the document analysis area including at least one hall sensor for detecting at least one of multiple documents in the first transport path or the second transport path and skewness of a documents in the first transport path or the second transport path.

9. A core module for an Automated Transaction Machine (ATM) comprising:

a housing including a plurality of cassette bays;

a first document delivery system;

a second document delivery system, the first document delivery system for transporting a document between the cassette bays and the second document delivery system via a first transport path, the second document delivery system for transporting the document between the first document delivery system and an other location with the ATM via a second transport path; and a plurality grounding pins, each grounding pin disposed in a respective one of the cassette bays for interaction with a respective cassette disposed within the respective cassette bay for static discharge of the respective cassette.

10. A core module for an Automated Transaction Machine (ATM) comprising:

a housing including a plurality of cassette bays;

a first document delivery system;

a second document delivery system, the first document delivery system for transporting a document between the cassette bays and the second document delivery system via a first transport path, the second document delivery system for transporting the document between the first document delivery system and an other location with the ATM via a second transport path;

a plurality of first motors, each first motor associated with a respective one of the cassette bays for driving a picking device configured to pick at least documents from a respective cassette disposed in the respective cassette bay;

a plurality grounding pins, each grounding pin disposed in a respective one of the cassette bays for interaction with a respective cassette disposed within the respective cassette bay for static discharge of the respective cassette; and a fascia gate separable gear drive having a fixed gear configured to mesh with a spring-loaded gear when moving from a separated position into an interlocking position with the spring-loaded gear.

11. The core module of claim 10 further comprising:

a document analysis area along the first transport path or between the first transport path and the second transport path or along the second transport path, the document analysis are including at least one hall sensor for detecting at least one of multiple documents in the first transport path or the second transport path and skewness of a documents in the first transport path or the second transport path.

* * * * *